C. F. OVERLY.

WINDOW SASH.

APPLICATION FILED DEC. 3, 1906.

Reissued Mar. 25, 1913.

13,547.

Witnesses

Raphael Netter

Florence E. Newbury

C. F. Overly, Inventor

By his Attorney H. F. Newbury.

COLUMBIA PLANOGRAPH CO., WASHINGTON, D. C.

UNITED STATES PATENT OFFICE.

CHARLES F. OVERLY, OF PITTSBURGH, PENNSYLVANIA, ASSIGNOR TO OLIVER M. EDWARDS, OF SYRACUSE, NEW YORK.

WINDOW-SASH.

13,547. Specification of Reissued Letters Patent. Reissued Mar. 25, 1913.

Original No. 806,909, dated December 12, 1905, Serial No. 266,627. Application for reissue filed December 3, 1906. Serial No. 346,194.

*To all whom it may concern:*

Be it known that I, CHARLES F. OVERLY, a citizen of the United States of America, residing at Homewood, Pittsburgh, in the county of Allegheny and State of Pennsylvania, have invented new and useful Improvements in Window-Sashes, of which the following is a specification.

This invention relates to improvements in window-sashes and sash-frames, and particularly to an antifriction and antirattling weather-strip and roller-bearing attachment for sashes, one object of the invention being to provide simple, efficient, and inexpensive means for closing the joint between the sides of a sash and jambs of the window-frame to exclude cold-air currents and prevent the access of rain, dust, &c., and to mount the sash in such manner as to adapt it to have free movement and to prevent rattling thereof.

Another object is to provide a construction of antifriction-roller bearings which will enable the parts to be adjusted to compensate for expansion and contraction from climatic changes.

Another object is to provide a weather-strip and antifriction-bearing attachment which will permit ready removal of the sash when occasion requires.

With these and other objects in view the invention consists of the novel construction and combination of parts hereinafter fully described and claimed, reference being had to the accompanying drawings, in which—

Figure 1:
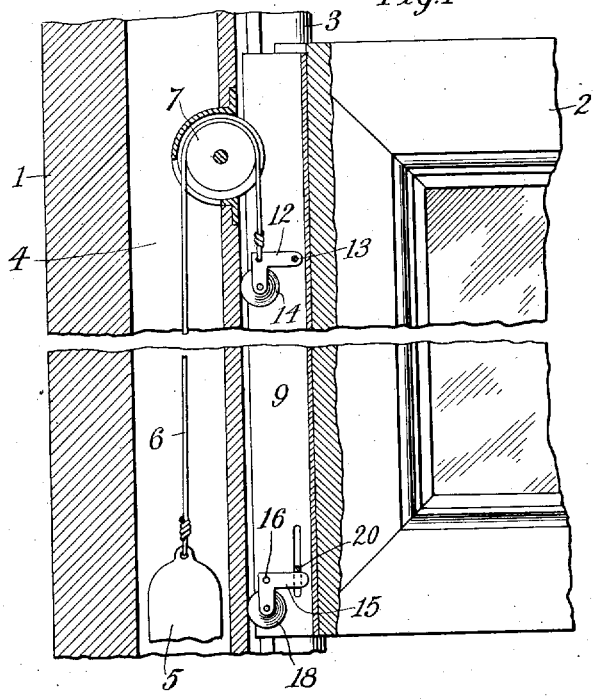
Figure 3:
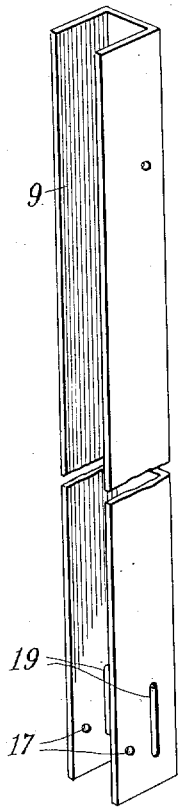
Figure 2:
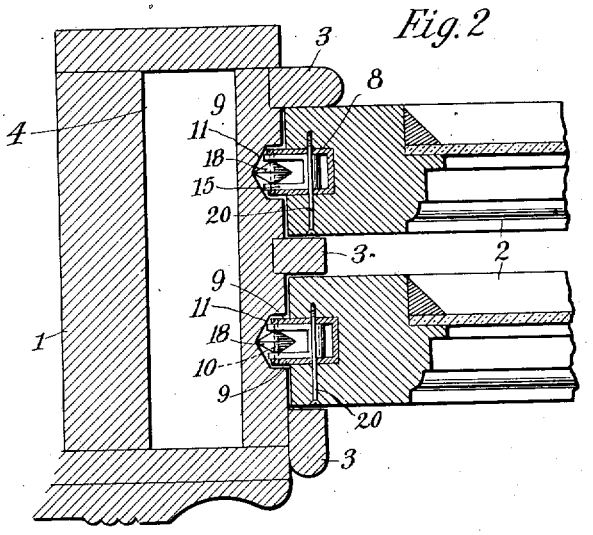
Figure 4:
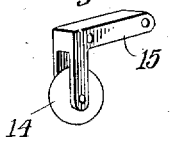

Figure 1 is a vertical transverse section through a portion of one of the side edges of a sash and the jamb of a window-frame, showing the application of the invention thereto. Fig. 2 is a horizontal section through the jamb and adjacent upper and lower side edges of the sashes. Fig. 3 is a perspective view of the weather-strip, and Fig. 4 is a similar view of one of the brackets and bearing-rollers.

Referring now more particularly to the drawings, the numeral 1 designates one of the jambs of a window-frame, and 2 a window-sash. The jamb 1 is provided upon its inner face with the usual spaced stop beads on confining-strips 3, forming a guideway for the sash, and with the guide-channel 4 for the sash-weight 5, suspended in the usual manner from one end of a chain or cord 6, the opposite end of which is attached to the sash and passes intermediately over a guide-roller 7, journaled upon the jamb.

The edge of the sash is formed with a vertical recess 8 to receive a weather-strip 9, which is preferably formed from sheet metal and is longitudinally channeled or of approximately U shape in cross-section, the body portion of said strip being arranged to bear against the side walls of the recess and project beyond the same into a recess 10, formed in the face of the jamb, thus closing the joint between the sash and jamb and preventing the access of cold-air currents, dust, rain, &c., into the room. The recess 10 in the jamb is formed with an approximately V-shaped inner or base wall 11, as shown in Fig. 2.

The outer end of the cord or chain 6 is attached to an approximately L-shaped bracket 12, pivotally mounted at the inner end of its horizontal arm upon a securing-screw 13, extending across the recess 8 and entered into the sash from the inner side thereof, said screw thus serving also to fasten the upper end of the strip to the sash. The vertical or depending arm of the bracket 12 is slotted or bifurcated, as shown in Fig. 4, to receive a bearing and guide roller 14, journaled between the arms thereof and projecting into the jamb-recess 10. The cord or chain 6 is attached to the outer end of the horizontal arm of this bracket 12 and under the action of the weight 5 serves to tilt said bracket outwardly and upwardly, thereby producing pressure upon the roller 14 to hold it properly seated in the recess 10 to guide the upper portion of the sash and hold the same from rattling. A similar bracket 15 is pivotally mounted at its angle upon a pivot-screw 16, inserted in openings 17 in the sides of the weather-strip, adjacent the lower end thereof, and has its vertical or depending arm bifurcated to receive a bearing and guide roller 18, which is suitably journaled therein and projects beyond the strip into the recess 10. In the side walls of the strip, adjacent to the openings 17, are formed vertical slots 19, through which passes a pin or screw 20, which is entered into the sash upon the inner face thereof and extends through the strip into the outer wall of the recess 8, and thus serves, in conjunction with the screw 13, to hold the strip in position. This pin 20 is arranged above and bears on the horizontal arm of the bracket 15, and thereby holds the vertical arm thereof tilted outwardly at a desired angle to maintain the roller 18 properly seated in the recess 8 to guide the lower portion of the sash and prevent rattling thereof. The projecting free edges of the side walls of the strip 9 bear against or are located in close juxtaposition to the side walls of the recess 10 to prevent or limit the outward and inward play or vibration of the sash, and in order to further limit such play of the sash the rollers 14 and 18 are formed with beveled or V-shaped peripheries and engage the apex portion of the wall 11. As the wall is V-shaped, it will be seen that the described form of rollers in connection therewith will prevent the rollers from having either inward or outward play and will cause them to guide the sash in a true vertical path, whereby vibration and rattling of the sash will be effectually prevented. The rollers act as antifriction bearings, thus permitting the sash to be raised and lowered with facility.

It will be understood that the construction above described is the same at both sides of the sash and window-frame and that both sashes of a window are intended to be provided with the improved strip and antifriction antirattling bearing attachments, thus mounting both sashes alike, so as to free them from the objections incident to sashes mounted in the ordinary manner. The pressure of the roller 18 may be regulated by varying the position of the pin 20 in the slots 19, while the roller 14 will always be projected to bear with the desired degree of force by the weight 5, as will be readily understood. Upon removing the bolts 13 and 20 the sash 2 will be disconnected from the weather-strips, thus permitting it to be readily removed from the window-frame.

It will be understood that the invention may be applied to sashes and frames constructed of wood or metal and that where metal is employed the construction will act in case of fire to prevent spreading of the flames, as the weather-strip will close the joint air-tight and prevent the entrace of air-currents. The improved attachment is simple in construction and efficient in use and may be applied to sashes and window-frames of ordinary type without varying the construction thereof.

It will also be understood that the invention may be applied to sliding doors.

As herein illustrated the part 12 is in the form of a lever, one end of which is shown as pivotally mounted upon the sash and the opposite end bears against the window frame. Between these two points the cord or connection 6 attached to the sash balancing weight or means 5 is connected to this sash holding device 12, so that such weight or balancing means continually tends to force the sash away from the frame toward the opposite edge of the sash. The use of one of these sash holding devices at each of the opposite edges of the sash results in one coacting with the other in holding it with substantially an equal force at both edges thereof, and such holding device at each edge continuously remains in holding contact while the sash is being either raised or lowered in the window frame.

Having thus described the invention, what is claimed as new is—

1. In a window the combination, substantially as set forth, of a frame with a V shaped recess at each side thereof, a sash slidably mounted therein, balancing means adapted to coact with the frame to exert their force in balancing the sash therein, a plurality of holding devices each provided with a V shaped movable portion adapted to bear in the V shaped recesses of the frame, one of such movable portions being mounted on each edge portion of the sash and adapted to transmit the force of the balancing means to the sash through its connection therewith, and connecting means arranged between the balancing means and the movable portions of the holding devices, which means are adapted to more or less balance and hold the sash through their action on the movable portions of the holding devices mounted thereon.

2. The combination with a window-frame, and a sash slidably mounted therein, of a balancing-weight arranged in the window-frame, an L-shaped bracket having one of its arms horizontally disposed and pivoted to the sash and its vertical arm carrying a bearing-roller to bear upon the window-frame, and a connection between the balancing-weight and bracket, said connection being attached to the bracket at the junction of the arms thereof.

3. The combination with a window-frame, and a sash slidably mounted therein, said frame and sash being provided with recesses, of a joint-closing strip mounted in the recess of the sash and projecting into the recess of the frame, a balancing-weight arranged in the window-frame, a bearing-bracket provided with a roller-bearing upon the window-frame, a fastening member securing said strip to the sash and pivotally mounting the bracket thereon, and a connection between the weight and bracket whereby the weight is suspended from said bracket and serves to hold the roller in contact with the window-frame with the desired degree of force.

4. The combination with a window-frame, and a sash slidably mounted therein, said frame and sash being provided with recesses, of a channeled joint-strip mounted in the recess and projecting into the recess of the window-frame, bearing-rollers arranged in the channeled joint-strip and projecting into the recess of the window-frame and bearing thereon, means for adjusting the lower roller to regulate the pressure thereof, a balancing-weight arranged in the window-frame, and a connection between said weight and the upper bearing-roller, whereby the weight is suspended from said roller and serves to hold the same in contact with the frame with the desired degree of force.

5. The combination with a window-frame, and a sash slidably mounted therein, said frame and sash being provided with recesses, of a channeled joint-closer disposed in the recess of the sash and projecting into the recess of the frame, upper and lower bearing-rollers arranged in the channeled joint-closer and projecting into the recess in the window-frame and engaging said frame, a sash-balancing weight connected with the upper roller for automatically regulating the pressure thereof, and means for manually regulating the pressure of the lower roller.

6. In a combined joint-closer and anti-friction guide-bearing for sashes or doors, the combination with a sash provided with a recess in its side edge, a window-frame provided in its face portion with a recess having a substantially V-shaped inner wall, V-shaped upper and lower bearing-rollers engaging the inner wall of the recess in the window-frame, and a joint-closing support mounted in the recess in the sash and carrying said rollers and projecting into the recess in the window-frame.

7. The combination with a window-frame provided in its face portion with a recess, of a window-sash slidably mounted therein and provided in its side edge with a recess, a channeled joint-closing strip disposed in the recess in the sash and projecting therefrom into the recess in the window-frame, said strip being provided at its lower end with slots in the side walls thereof, upper and lower pivot-pins projecting transversely through said strip and securing the same to the sash, angular brackets pivotally mounted upon said pivot-pins and provided with rollers bearing against the window-frame, a pin adjustably mounted in the slots in the strip and sash to adjust the lower bearing-bracket to regulate the pressure of the roller thereof, a balancing-weight arranged in the window-frame, and a connection between said weight and the upper bearing-bracket, whereby the weight is suspended from said bracket and automatically regulates the pressure of the roller carried thereby on the window-frame.

8. In a combined joint-closer and anti-friction guide-bearing for window-sashes or doors, the combination of a window-frame provided with a guide-recess, a sash provided in its side edge with a recess, a channeled strip mounted in the latter-named recess and projecting therefrom into said guide-recess, bearing-rollers supported in said strip and projecting into and bearing upon the wall of the guide-recess, a sash-balancing weight, a connection between the same and the upper bearing-roller to support the sash and automatically project said roller with the desired pressure, and means for regulating the pressure of the lower roller.

In testimony whereof I affix my signature in presence of two witnesses.

CHARLES F. OVERLY.

Witnesses:
J. M. DENNY,
S. G. SARTWELL.

Copies of this patent may be obtained for five cents each, by addressing the "Commissioner of Patents, Washington, D. C."